(12) United States Patent  
Shrowty et al.

(10) Patent No.: US 7,007,259 B2
(45) Date of Patent: Feb. 28, 2006

(54) METHOD FOR PROVIDING CLOCK-NET AWARE DUMMY METAL USING DUMMY REGIONS

(75) Inventors: Vikram Shrowty, Fremont, CA (US); Santhanakrishnan Raman, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 260 days.

(21) Appl. No.: 10/632,622

(22) Filed: Jul. 31, 2003

(65) Prior Publication Data

US 2005/0028121 A1   Feb. 3, 2005

(51) Int. Cl.
G06F 9/45 (2006.01)
G06F 17/50 (2006.01)
(52) U.S. Cl. ................ 716/10; 716/2; 716/6
(58) Field of Classification Search ............ None
See application file for complete search history.

(56) References Cited

U.S. PATENT DOCUMENTS

| 6,093,214 | A | 7/2000 | Dillon | 716/17 |
|---|---|---|---|---|
| 6,446,248 | B1 | 9/2002 | Solomon et al. | 716/17 |
| 6,751,785 | B1 * | 6/2004 | Oh | 716/10 |
| 6,815,811 | B1 * | 11/2004 | Ozawa et al. | 257/691 |
| 2003/0177464 | A1 * | 9/2003 | Takechi et al. | 716/10 |
| 2003/0204832 | A1 * | 10/2003 | Matumoto | 716/19 |
| 2003/0229479 | A1 * | 12/2003 | Smith et al. | 703/14 |

OTHER PUBLICATIONS

Liu, George Y. et al., "Chip-Level CMP Modeling and Smart Dummy for HDP and Conformal CVD Films," CMP-MIC Conference, Feb. 11-12, 1999, pp. 120-127.

* cited by examiner

*Primary Examiner*—Leigh M. Garbowski
(74) *Attorney, Agent, or Firm*—Sawyer Law Group LLP

(57) ABSTRACT

A method and system is disclosed for inserting dummy metal into a circuit design, which includes a plurality of objects and clock nets. Aspects of the invention include identifying free spaces on each layer of the chip design suitable for dummy metal insertion, wherein the free spaces are referred to as dummy regions. Thereafter, the dummy regions are prioritized such that the dummy regions located adjacent to clock nets are filled with dummy metal last. In a preferred embodiment, the dummy regions are further prioritized such that the dummy regions adjacent to wider clock nets are filled with dummy metal after dummy regions that are located adjacent to narrower clock nets.

37 Claims, 5 Drawing Sheets

Tile Properties

| Dummy List 60 | | | |
|---|---|---|---|
| Dummy Region | Clock Net Width | Clock Net Edge | Timing Factor |
| Dummy Region | | | Timing Factor |
| Dummy Region | Clock Net Width | Clock Net Edge | Timing Factor |
| Dummy Region | | | Timing Factor |
| Dummy Region | Clock Net Width | Clock Net Edge | Timing Factor |
| 50 / | 68 / | ⋮ 70 / | 72 / |
| Dummy Region | Clock Net Width | Clock Net Edge | Timing Factor |

METHOD FOR PROVIDING CLOCK-NET AWARE DUMMY METAL USING DUMMY REGIONS

FIELD OF THE INVENTION

The present invention relates to methods for patterning dummy metal to achieve planarity for chemical-mechanical polishing of integrated circuits, and more particularly to a dummy fill software tool that provides clock-net aware dummy metal using dummy regions.

BACKGROUND OF THE INVENTION

Chemical Mechanical Polishing (CMP) is a part of the chip fabrication process that requires a uniform distribution of metal and silicon over the surface of the chip. To achieve this distribution, pieces of interconnect (metal or silicon) must be inserted into available spaces in low-density regions of the chip. This interconnect insertion is called dummy metal filling or simply dummy filling, and the inserted interconnect is called dummy metal.

Most fabrication processes require a minimum density for the interconnects on each layer of a multi-layer chip design. The interconnect density for a region is the sum total of the area of all interconnect in that region divided by the area of the region. Fabrication processes typically partition each layer of the design into rectangular regions, called tiles, and specify that the interconnect density of each tile meet a minimum density requirement.

The process of determining the number and placement of dummy metal is typically preformed by a dummy fill software tool after routing and timing closure during chip design flow. The dummy fill tool examines the tiles in each layer of the design and determines whether each tile has an interconnect density equal to or greater than the specified minimum density. If the interconnect density does not meet the minimum density, then the dummy fill tool inserts dummy metal in free regions of the tile.

Because dummy filling is one of the last steps in the chip design flow, it is important that the dummy metal is inserted into the chip in such a manner that minimizes any negative impact to timing. That is, patterning the dummy metal too close to signal nets increases capacitance between the dummy lines and the signal wires. The increased capacitance can affect the signal nets by slowing the transmission speed of signals, thereby degrading overall performance of the integrated circuit.

Therefore, a common goal of dummy filling techniques is the minimization of the parasitic capacitance introduced by the dummy metal. The parasitic capacitance introduced by a piece of dummy metal on a signal wire is inversely proportional to the distance between the two. This means that to minimize timing impact, dummy metal must be placed far away from signal nets.

Of signal nets, clock nets are of particular importance. Care must be taken to minimize the negative timing impact to clock nets. Traditionally, this has been achieved with a simplistic approach. The dummy fill tool is programmed to maintain a larger distance between wires of clock nets and the inserted dummy metal. This large dummy to clock distance is arrived at by studying the effect on timing that the inserted dummy metal has at various distances from clock nets in sample designs, and then hardcoding the distances into the dummy fill libraries for each type of process technology.

However, hardcoding a large "stay-away" distance between dummy metal and clock nets may lead to less available space in each tile for dummy metal insertion. New process technologies increasingly demand higher minimum density values and more timing-aggresive designs. In this scenario, use of the simple large dummy-to-clock distance methodology is disadvantageous. This is because it is often impossible to insert enough dummy metal into a tile to meet the required minimum density without reducing the large dummy-to-clock distance. In this case, traditional metal-fill tools complete their run without reaching minimum density in some tiles, requiring a second run of the tool for the problematic tiles in which the dummy-to-clock distance is reduced. If there is more than one such tile requiring a rerun, and the dummy fill tool can handle only one tile at a time, multiple runs may be needed: one for each tile. Such an involved, iterative process can significantly impact the design schedule.

Accordingly what is needed is an algorithm for dummy fill that minimizes the negative timing impact of dummy metal on clock nets, while at the same time achieving minimum density in a single run. The present invention addresses such a need.

SUMMARY OF THE INVENTION

The present invention provides a method for inserting dummy metal into a circuit design, which includes a plurality of objects and clock nets. Aspects of the invention include identifying free spaces on each layer of the chip design suitable for dummy metal insertion, wherein the free spaces are referred to as dummy regions. Thereafter, the dummy regions are prioritized such that the dummy regions located adjacent to clock nets are filled with dummy metal last. In a preferred embodiment, the dummy regions are further prioritized such that the dummy regions adjacent to wider clock nets are filled with dummy metal after dummy regions that are located adjacent to narrower clock nets.

According to the method and system disclosed herein, inserting dummy metal into dummy regions that are not adjacent to clock nets prior to inserting dummy metal into clock-net adjacent dummy regions will be sufficient to meet the minimum density requirement. This means that in many cases, no dummy metal (or a minimal amount) is inserted in the clock-net adjacent dummy regions, thereby minimizing the timing impact to the adjacent clock nets.

DETAILED DESCRIPTION OF THE INVENTION

The present invention relates to design methodologies for dummy metal filling. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
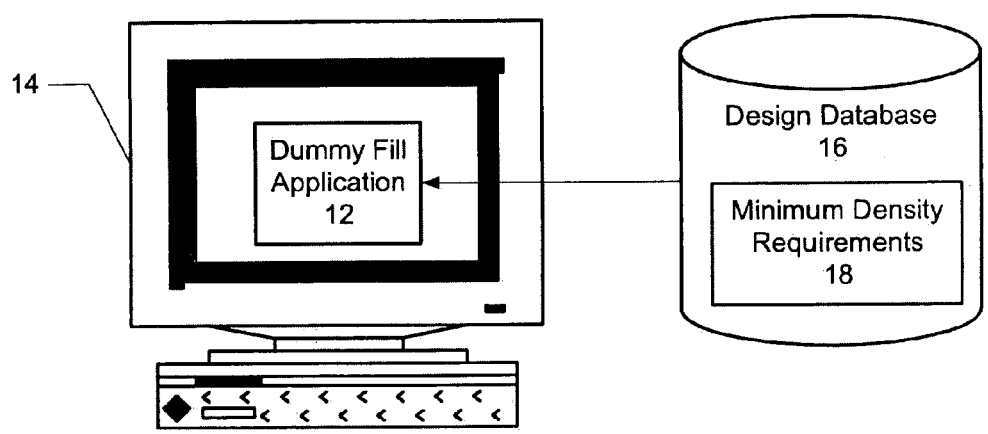
FIG. 1 is a block diagram illustrating a software and hardware environment in which the present invention may be implemented.

The present invention provides a software tool for dummy metal filling of a chip design during the design phase. FIG. 1 is a block diagram illustrating a software and hardware environment in which the present invention may be implemented. The dummy fill software application 12 is preferably executed on a computer 14, which may be a workstation or a server. The dummy fill application 12 accesses a design database 16, which includes information describing all objects of a fully routed integrated circuit design, such as cells, interconnects, and signal nets. In a preferred environment, each layer of the chip is partitioned into tiles, each equal in size to a process-specified tile-size. The design database 16 also includes the minimum density requirement for the tiles. The dummy fill application 12 is one of many design flow tools, and is primarily invoked after routing and timing closure stages of a design flow.

According to the present invention, the dummy fill application 12 inserts dummy metal into the chip design in a manner that minimizes the timing impact to clock nets, while the same time achieving the minimum density requirement in a single run. The dummy fill application 12 operates in two phases. In the first phase, referred to as the free-space finding phase, the dummy fill application 12 searches each layer of the chip design for empty spaces suitable for dummy metal insertion. These empty spaces are referred to herein as dummy regions.

In the second phase, referred to as the dummy metal insertion phase, the dummy fill application 12 inserts a sufficient amount of dummy metal into the dummy regions discovered in the first phase to meet the minimum density requirement of each tile, but prior to doing so, prioritizes the dummy regions such that the dummy regions located adjacent to clock nets are filled with dummy metal last. And, as further described below, the dummy regions adjacent to wider clock nets are filled with dummy metal after dummy regions adjacent to narrower clock nets.

By prioritizing the empty spaces in this manner, the minimum density requirements of the chip can be met, while minimizing negative impact to the clock nets because the distance between the dummy metal and clock nets, especially the thicker, more important clock nets, is maximized.

Figure 2:
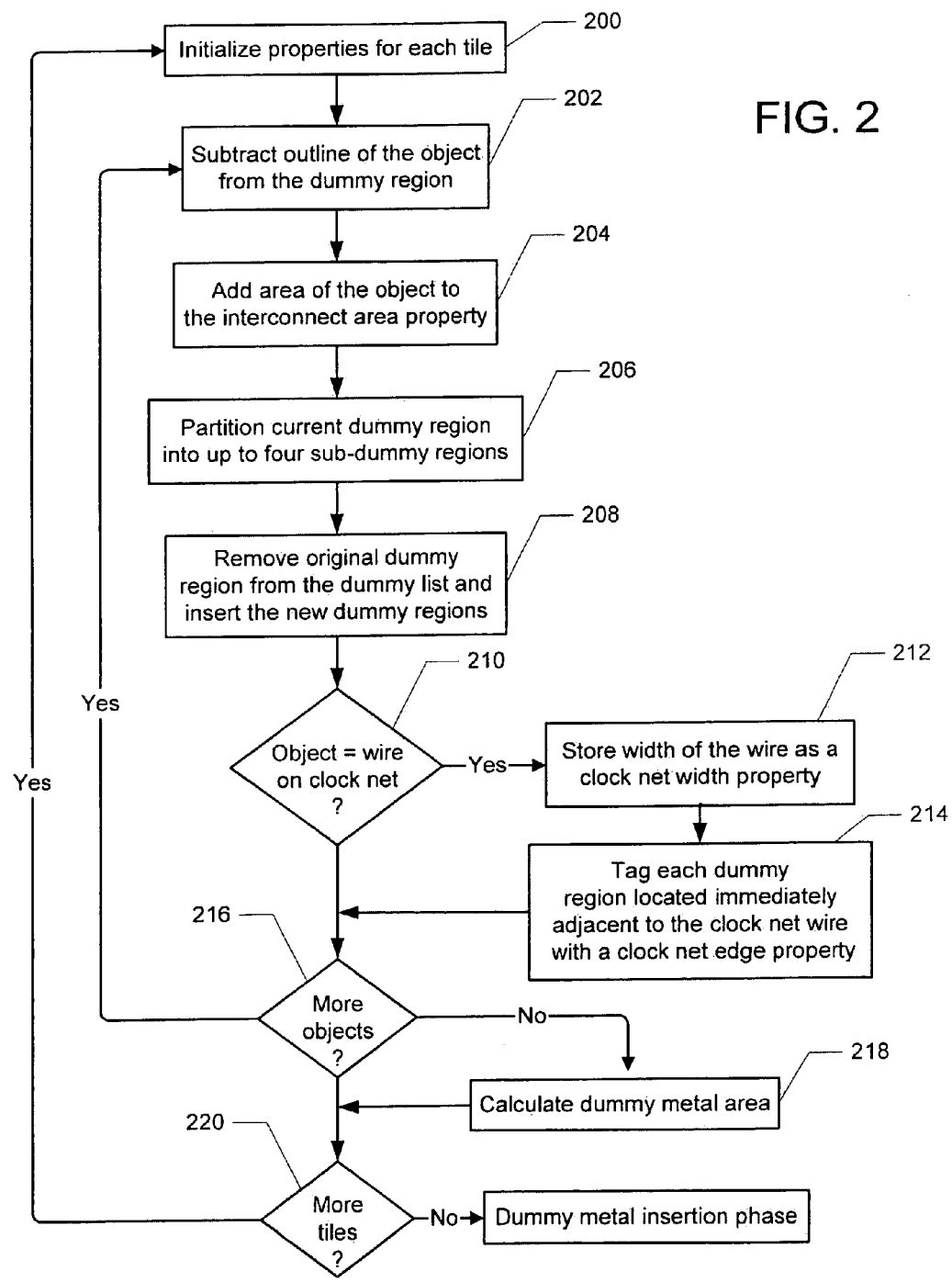
FIG. 2 is a flow diagram illustrating the process performed by the dummy fill application for inserting dummy metal into the chip design during a free space finding phase.

FIG. 2 is a flow diagram illustrating the process for inserting dummy metal into the chip design performed by the dummy fill application 12 during the free space finding phase. The free space finding phase begins in step 200 by initializing a series of properties for each tile, including a dummy region list, interconnect area, and dummy metal area. The dummy regions are a list of free areas in the tile suitable for dummy metal. In a preferred embodiment, the dummy region list for each tile is initialized with a single rectangle corresponding to the outline of the tile. The interconnect area property will be used to specify the total amount of interconnect area included in the tile, and the dummy metal area property will be used to specify the total amount of dummy metal inserted into the tile.

In step 202, the dummy fill application 12 traverses the design database 16 and for each object found in the current tile, subtracts the outline of the object from the dummy region on which it lies.

Figure 3:
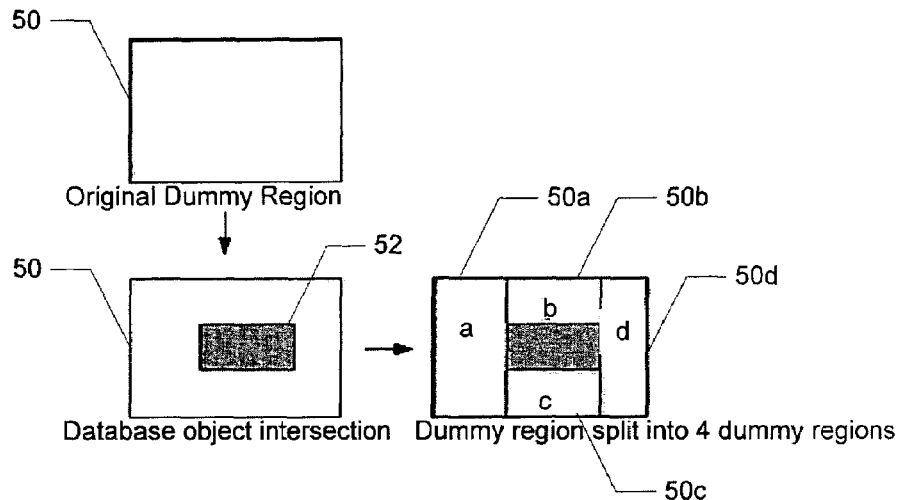
FIG. 3 is a diagram showing the handling of the dummy regions in a tile after all objects in the database have been iterated over.

FIG. 3 is a diagram showing the processing of a dummy region 50 once an object 52 is found intersecting the dummy region 50. Referring to both FIGS. 2 and 3, the area of the object 52 is added to the interconnect area property for the tile in step 204. In step 206, the current dummy region is partitioned into up to four sub-dummy regions 50a–50d around the subtracted area. In a preferred embodiment, each sub-dummy region 50a–50d is formed between one of the edges of the object 52 and the corresponding edge of the current dummy region 50. Therefore, if the object 52 is located along one edge of the original dummy region 50, then only three sub-dummy regions 50a–50c will be created. In step 208, the original dummy region 50 is removed from the dummy list and the new dummy regions 54 are inserted into the list. The result of this process is a list of dummy regions 50 that represent free spaces in the tile suitable for dummy metal.

According to the present invention, objects in the design database 16 representing wires on clock nets are treated specially. If it is determined in step 210 that the current object is a wire on a clock net, then in step 212, the width of the wire is stored as a clock net width property of the region 50 created by its outline. Also, the sub-dummy regions 50a–50c located immediately adjacent to the clock net wire are tagged with a clock net edge property as well as the clock net width property in step 214 so as to be identifiable later. The sub-dummy regions 50a–50c replace their parent (50) on the dummy list.

In step 216, it is determined if the current tile includes additional objects, and if so, the database traversal continues.

Figure 4:
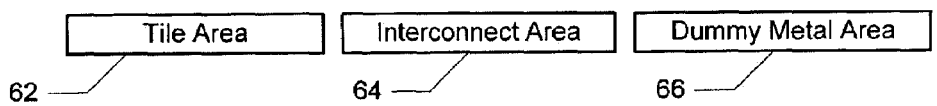
FIG. 4 is a diagram illustrating the properties stored for each tile.

FIG. 4 is a diagram illustrating the properties stored for each tile after all the objects have been found. The properties include the dummy region list 60, the tile area 62, the interconnect area 64, and the dummy metal area 66. Also maintained for each clock net region is a timing factor 72, which is calculated during the second phase. In addition, several properties may also be maintained for each of the dummy regions 50 in the dummy region list 60 including a clock net edge 70 property, which identifies the region as being adjacent to a clock net, and a clock net width 68 property, which identifies the width of the adjacent clock net wire.

Referring again to FIG. 2, according to one aspect of the present invention, the dummy metal area 66 that needs to be inserted to meet minimum density is calculated in step 218 for the current tile is as follows:

Dummy Metal Area=(Minimum Density*Tile Area)
 −Interconnect Area

In step 220, it is determined whether there are more tiles to process. If there are more tiles, the process continues. Otherwise, the free space finding phase is complete and the dummy fill application 12 executes the dummy metal insertion phase.

Figure 5:
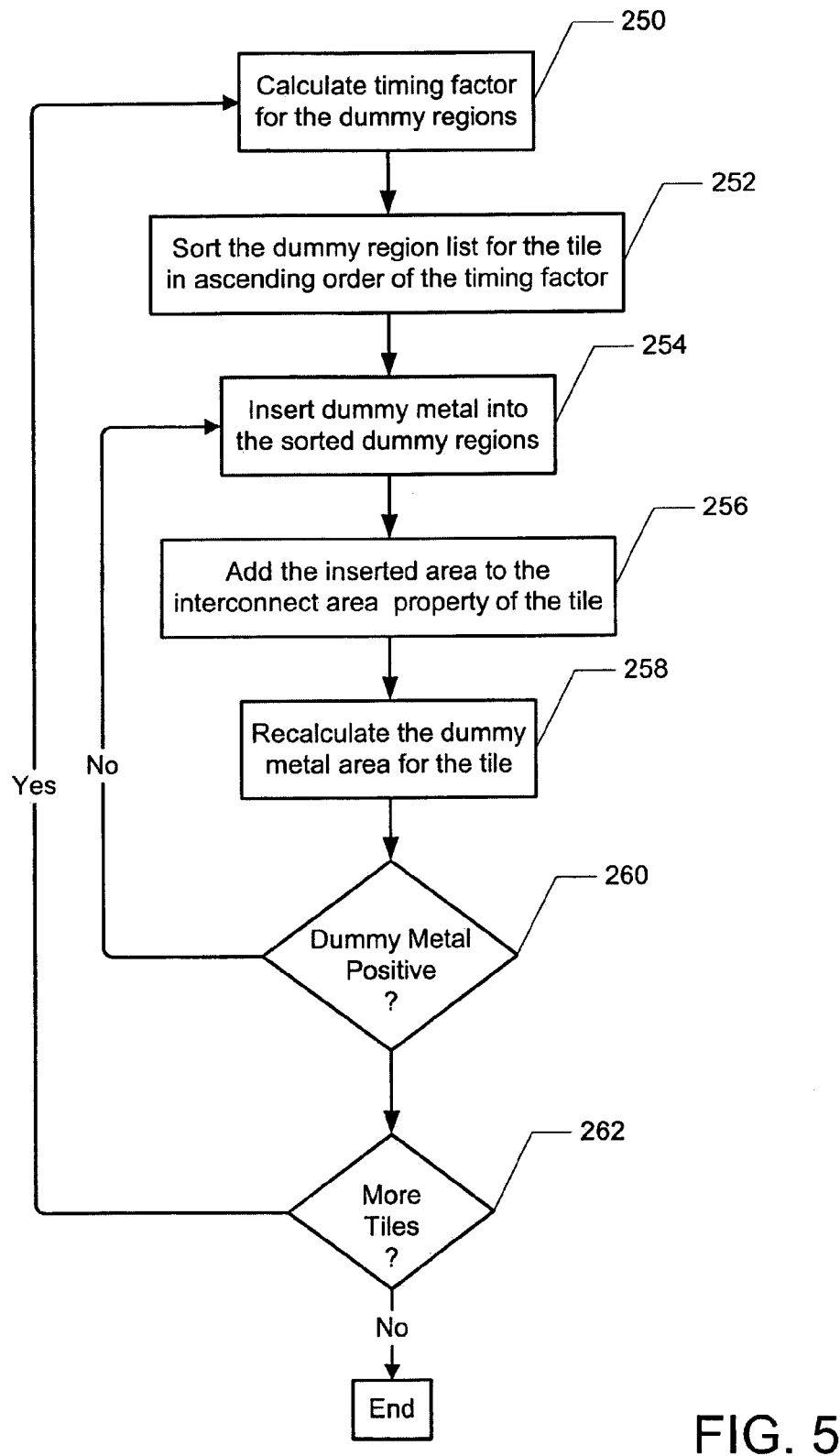
FIG. 5 is a flow diagram illustrating the process performed by the dummy fill application during a dummy metal insertion phase.

FIG. 5 is a flow diagram illustrating the process performed by the dummy fill application 12 during the dummy metal insertion phase. The dummy metal insertion phase begins in step 250 in which the timing factor 72 is calculated for each dummy region 50 in the list 60 that has a clock net width 68 property. The timing factor 72 attempts to capture the timing criticality of a dummy region 50. In a clock tree, the width of a wire is indicative of its order in a hierarchy. A wide wire is likely to be supplying current to more branches than a thinner wire, and is therefore more timing critical.

In a preferred embodiment, the timing factor 72 is calculated using the formula:

Timing Factor=Clock Net Width*Clock Net Criticality

According to one aspect of the present invention, the clock net criticality is an integral value that the user can specify to control the timing factor 72 assigned to the dummy regions. In a preferred embodiment, the criticality factor is assigned to the entire clock net and is inherited by all wires on that clock net. Also in a preferred embodiment, the clock net criticality values are stored in the form of lookup table in file and provides the user control over relative treatment of clock nets. More critical clock nets can be given higher values. In the absence of a user-specified value, the clock net criticality for a clock net is assigned some default value, e.g., '1'.

The table below illustrates an example Clock Net Criticality Lookup table:

| Clock Nets | Clock Net Criticality |
|---|---|
| Clock_Net_A | 2 |
| Clock_Net_B | 3 |
| | |

In a preferred embodiment, all dummy regions 50 not adjacent to a clock-net wire are assigned a Timing Factor of 0.

Referring again to FIG. 5, after the timing factors 72 have been calculated in step 252, the dummy region list 60 for each tile is sorted in ascending order of the timing factor 72. According to the present invention, this establishes a prioritization for the dummy regions 50 in which dummy regions 50 adjacent to clock nets are placed on the list 60 after dummy regions 50 that are not adjacent to clock nets. Within the sub-list of clock-net adjacent dummy regions 50, the dummy regions 50 adjacent to wider wires of a clock net are listed after the dummy regions 50 adjacent to narrower wires of the same clock net. Between two dummy regions 50 adjacent to clock net wires of the same width, the dummy region 50 that is adjacent to a net having a higher criticality value is listed after the other.

After the sorting, the dummy that application 12 in step 254, begins inserting dummy metal into the sorted dummy regions 50, starting with the first dummy region 50 on the list. After each insertion, the inserted area is added to the interconnect area 64 property of the tile in step 256, and the dummy metal area 66 for the tile is recalculated in step 258.

This process is continued in step 260 until the dummy metal area 66 becomes negative. Thereafter, the process continues with the next tile in step 262 until all tiles are processed.

In most cases, the value for the dummy metal area 66 will become negative before traversal of the dummy region list 60 reaches the clock-net adjacent dummy regions 50. This means that in many cases, no dummy metal (or a minimal amount) is inserted in the clock-net adjacent dummy regions 50, thereby minimizing the timing impact to the adjacent clock nets.

Figure 6:
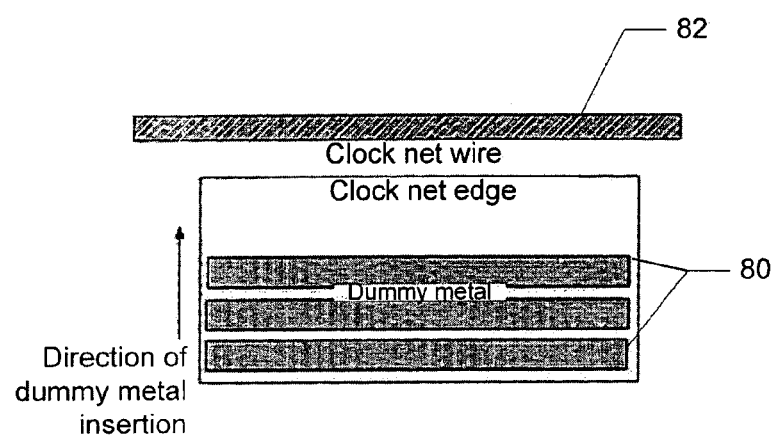
FIG. 6 is a diagram illustrating metal insertion in clock-net adjacent dummy regions according to preferred embodiment of the present invention.

If metal insertion is required in any of the clock-net adjacent dummy regions 50, then the metal insertion may be performed starting with the edge opposite the clock-net adjacent edge, using the clock net edge 70 property. FIG. 6 is a diagram showing the insertion of dummy metal in a clock-net adjacent dummy region, starting with the edge opposite to the one identified by the clock net edge 70 property. According to this aspect of the present invention, if the value for the dummy metal area 66 becomes negative before the clock-net adjacent dummy region 50 is completely filled, the spacing between the dummy metal 80 and the clock net wire 82 is the maximum possible.

A dummy fill application 12 has been described that provides a simple and efficient method for dummy metal insertion that minimizes the timing impact to clock nets and at the same time guarantees reaching minimum density in a single pass.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for inserting dummy metal into a circuit design, the circuit design including a plurality of objects and clock nets, the method comprising:
   (a) identifying free spaces on each layer of the circuit design suitable for dummy metal insertion as dummy regions; and
   (b) prioritizing the dummy regions such that the dummy regions located adjacent to clock nets are filled with dummy metal last, thereby minimizing any timing impact on the clock nets.

2. The method of claim 1 wherein step (b) further includes the step of: prioritizing the dummy regions such that the dummy regions adjacent to wider clock nets are filled with dummy metal after dummy regions that are located adjacent to narrower clock nets.

3. The method of claim 2 further including the step of: allowing a user to specify a clock net criticality value for the clock nets.

4. The method of claim 3 wherein step (b) further includes the step of: in an absence of a user-specified clock net criticality value for any of the clock nets, assigning a default value.

5. The method of claim 4 wherein step (b) further includes the step of: prioritizing the dummy regions such that between two dummy regions located adjacent to clock net wires of the same width, the dummy region that is adjacent to a clock net having a higher criticality value is filled with dummy metal after the other dummy region.

6. The method of claim 5 wherein step (b) further includes the step of: calculating a timing factor for each dummy region located adjacent to a clock net by multiplying a width of the clock net wire by the clock net criticality value.

7. The method of claim 6 wherein step (b) further includes the step of: assigning a timing factor value of 0 to all dummy regions not adjacent to a clock-net wire.

8. The method of claim 7 further including the step of: maintaining a dummy region list for each tile in the design.

9. The method of claim 8 wherein step (b) further includes the step of: sorting the timing factors assigned to each of the dummy regions in the list in order to prioritize the dummy regions in the tile.

10. The method of claim 9 wherein step (b) further includes the step of: inserting dummy metal into the dummy regions starting with the first dummy region on the list until a minimum density requirement for the tile is met.

11. The method of claim 10 wherein step (b) further includes the step of: after each dummy metal insertion, adding the area of the inserted dummy metal to an interconnect area property of the tile.

12. The method of claim 11 wherein step (b) further includes the step of: calculating a dummy metal area that needs to be inserted in the tile to meet a minimum density requirement as:

Dummy Metal Area=(Minimum Density*Tile Area) −Interconnect Area.

13. The method of claim 1 wherein step (a) further includes the step of: initializing a dummy region list for each tile as a single rectangle corresponding to the outline of the tile.

14. The method of claim 13 wherein step (a) further includes the step of: traversing a design database and for each object found in the current tile, subtracting an outline of the object from the dummy region on which it lies.

15. The method of claim 14 wherein step (a) further includes the step of: once an object is found intersecting a particular dummy region,
 (i) adding an area of the object to an interconnect area property for the tile,
 (ii) partitioning the dummy region into sub-dummy regions,
 (iii) removing the dummy region from the dummy region list, and
 (iv) adding the sub-dummy regions to the dummy region list.

16. The method of claim 15 wherein step (a) further includes the step of: if a particular object is a wire on a clock net, storing a width of the wire as a clock net width property of the dummy region created by an outline of the object, and tagging an edge of each dummy region located immediately adjacent to the clock net wire with a clock net edge property.

17. The method of claim 16 wherein step (b) further includes the step of: calculating a timing factor for each dummy region in the list that has a clock net width property, and sorting the dummy regions based on the timing factors.

18. A computer-readable medium containing program instructions for inserting dummy metal into a circuit design, the circuit design including a plurality of objects and clock nets, the program instructions for:
 (a) identifying free spaces on each layer of the circuit design suitable for dummy metal insertion as dummy regions; and
 (b) prioritizing the dummy regions such that the dummy regions located adjacent to clock nets are filled with dummy metal last, thereby minimizing any timing impact on the clock nets.

19. The computer-readable medium of claim 18 wherein instruction (b) further includes the instruction of: prioritizing the dummy regions such that the dummy regions adjacent to wider clock nets are filled with dummy metal after dummy regions that are located adjacent to narrower clock nets.

20. The computer-readable medium of claim 19 further including the instruction of: allowing a user to specify a clock net criticality value for the clock nets.

21. The computer-readable medium of claim 20 wherein instruction (b) further includes the instruction of: in an absence of a user-specified clock net criticality value for any of the clock nets, assigning a default value.

22. The computer-readable medium of claim 21 wherein instruction (b) further includes the instruction of: prioritizing the dummy regions such that between two dummy regions located adjacent to clock net wires of the same width, the dummy region that is adjacent to a clock net having a higher criticality value is filled with dummy metal after the other dummy region.

23. The computer-readable medium of claim 22 wherein instruction (b) further includes the instruction of: calculating a timing factor for each dummy region located adjacent to a clock net by multiplying a width of the clock net wire by the clock net criticality value.

24. The computer-readable medium of claim 23 wherein instruction (b) further includes the instruction of: assigning a timing factor value of 0 to all dummy regions not adjacent to a clock-net wire.

25. The computer-readable medium of claim 24 further including the instruction of: maintaining a dummy region list for each tile in the design.

26. The computer-readable medium of claim 25 wherein instruction (b) further includes the instruction of: sorting the timing factors assigned to each of the dummy regions in the list in order to prioritize the dummy regions in the tile.

27. The computer-readable medium of claim 26 wherein instruction (b) further includes the instruction of: inserting dummy metal into the dummy regions starting with the first dummy region on the list until a minimum density requirement for the tile is met.

28. The computer-readable medium of claim 27 wherein instruction (b) further includes the instruction of: after each dummy metal insertion, adding an area of the inserted dummy metal to an interconnect area property of the tile.

29. The computer-readable medium of claim 28 wherein instruction (b) further includes the instruction of: calculating a dummy metal area that needs to be inserted in the tile to meet a minimum density requirement as:

Dummy Metal Area=(Minimum Density*Tile Area) −Interconnect Area.

30. The computer-readable medium of claim 18 wherein instruction (a) further includes the instruction of: initializing a dummy region list for each tile as a single rectangle corresponding to the outline of the tile.

31. The computer-readable medium of claim 30 wherein instruction (a) further includes the instruction of: traversing a design database and for each object found in the current tile, subtracting an outline of the object from the dummy region on which it lies.

32. The computer-readable medium of claim 31 wherein instruction (a) further includes the instruction of: once an object is found intersecting a particular dummy region,
 (i) adding an area of the object to an interconnect area property for the tile,
 (ii) partitioning the dummy region into sub-dummy regions,
 (iii) removing the dummy region from the dummy region list, and
 (iv) adding the sub-dummy regions to the dummy region list.

33. The computer-readable medium of claim 32 wherein instruction (a) further includes the instruction of: if a particular object is a wire on a clock net, storing an width of the wire as a clock net width property of the dummy region created by an outline of the object, and tagging an edge of each dummy region located immediately adjacent to the clock net wire with a clock net edge property.

34. The computer-readable medium of claim 33 wherein instruction (b) further includes the instruction of: calculating a timing factor for each dummy region in the list that has a clock net width property, and sorting the dummy regions based on the timing factors.

35. A method for inserting dummy metal into a circuit design, the circuit design including a plurality of objects and clock nets, the method comprising:
  (a) identifying free spaces on each layer of the circuit design suitable for dummy metal insertion as dummy regions;
  (b) determining which of the dummy regions are located adjacent to clock nets;
  (c) assigning a timing factor to each dummy region based on an width of an adjacent clock net wire;
  (d) sorting the dummy regions based on the timing factors; and
  (e) inserting dummy metal into the sorted dummy regions such that the dummy regions located adjacent to increasingly wider clock nets are filled last, thereby minimizing any timing impact on the clock nets.

36. The method at claim 35 wherein step (c) further includes the steps of: assigning the timing factor based on the width of the adjacent clock net wire and a user-specified timing criticality value assigned to the clock net.

37. The method of claim 36 wherein step (e) further include the step of: inserting dummy metal into the sorted dummy regions one by one until a minimum density requirement for a current tile is met.

* * * * *